Nov. 3, 1970     J. BELART     3,537,261
FAIL-SAFE TWIN MASTER CYLINDER FOR HYDRAULIC BRAKING SYSTEM
Filed April 4, 1969
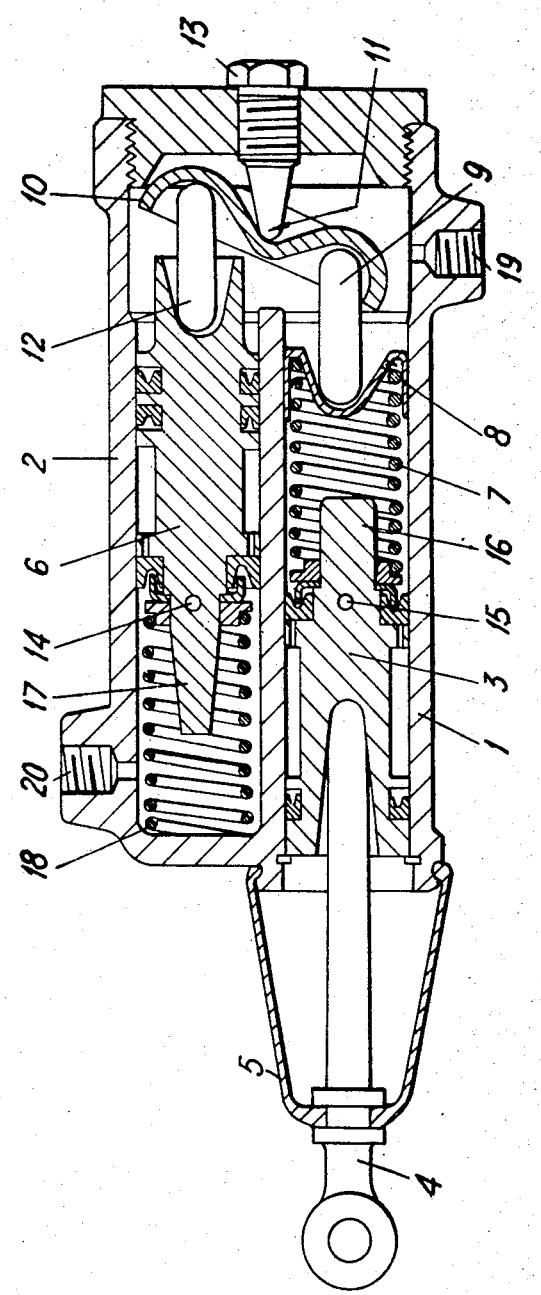
Inventor
JUAN BELART
By *William T. O'Kil*
AGENT ial section of a twin main cylinder according to the invention.

United States Patent Office 3,537,261
Patented Nov. 3, 1970

3,537,261
FAIL-SAFE TWIN MASTER CYLINDER FOR HYDRAULIC BRAKING SYSTEM
Juan Belart, Walldorf, Germany, assignor to International Telephone and Telegraph Corporation, New York, N.Y., a corporation of Delaware
Filed Apr. 4, 1969, Ser. No. 813,566
Claims priority, application Germany, Apr. 9, 1968, 1,755,184
Int. Cl. F15b 7/08
U.S. Cl. 60—54.6                              9 Claims

ABSTRACT OF THE DISCLOSURE

A twin master cylinder for a duel circuit hydraulic braking system, in which the actuation force is normally carried between the pistons hydraulically, but which may be transmitted mechanically in case of hydraulic failure in the first cylinder. The mechanical linkage is enclosed in the first cylinder. The mechanical linkage is enclosed and surrounded by the fluid of the first cylinder. Each cylinder includes a piston restoring helical spring.

CROSS REFERENCE TO RELATED APPLICATIONS

This application is filed under the provisions of 35 U.S.C. 119 with claim for the priority benefit of the filing of an application covering the same invention on Apr. 9, 1968, Ser. No. 1,755,184, in the Federal Republic of Germany.

DACKGROUND OF THE INVENTION

Field of the invention

The invention relates to hydraulic braking systems especially for motor vehicles, and more specifically to a dual or twin master cylinder for a dual hydraulic circuit ararngement.

Description of the prior art

In the prior art, dual circuit hydraulic braking systems are known and used in motor vehicle braking systems. Their purpose is to protect against the loss of all braking function when a hydraulic cylinder or pressure line fails.

The most dangerous type of hydraulic brake malfunction is one in which hydraulic fluid is lost, since this immediately reduces braking effectiveness substantially to zero.

Prior art twin master cylinder arrangements have frequently included separate but adjacent master cylinders whose activating piston rods were actuated from the ends of a rocker arm (tilting beam) which was in turn actuated at it center by the foot pedal linkage. Such an arrangement has the disadvantage of halving the applied force applied to each cylinder. Also, in the common prior art configuration lubrication and maintenance of the said rocker arm parts is required, and also some form of dust and dirt protection must be separately provided.

It will be apparent that such prior art systems operating on an emergency basis, with one cylinder nonfunctioning, operate with an effective master cylinder piston area of one half what is achieved in normal operation.

As the present specification proceeds, it will be apparent that the present invention provides unique structure to surmount these prior art disadvantages.

SUMMARY OF THE INVENTION

The principle object of the present invention was the provision of a twin master cylinder for dual hydraulic circuit braking systems, providing a fail-safe system without compromise of effective master cylinder piston area, and also providing a fully enclosed assembly in which the rocker arm is within the hydraulic fluid.

The general princpiles of the invention include a "series" cylinder actuation arrangement rather than a "parallel" system as employed in prior art system.

The first hydraulic cylinder is the one actuated directly by the foot pedal, whereas the second cylinder has the "floating" piston normally only hydraulically actuated from the first cylinder.

A rocker arm arrangement is employed, but is not actuated by foot pedal pressure as in the prior art. Rather the rocker arm in the assembly of the present invention operates to actuate the second cylinder if the first cylinder fails hydraulically. Normally the actuation of the second cylinder is by hydraulic pressure from the first cylinder and the rocker arm contributes little or nothing to this normal operation. Failure of the second circuit has no effect on the first cylinder operation, except possibly to make it work more easily, and failure in the first cylinder's system automatically invokes the mechanical linkage including said rocker arm to operate the second piston.

In accordance with a preferred embodiment of the invention, the primary cylinder contains a piston-shaped metal support member in the direction of throw from the first piston. This member which will sometimes hereinafter be referred to as a spring retaining piston, may be relatively simply fabricated. Sheet metal construction would suffice for this part, since it is not required to seal as it moves within the first cylinder.

A helical spring tends to retain a quiescent position for said support member with respect to the first piston. This support member may be dimpled to engage a toggle which in turn engages the rocker arm on one side of its fulcrum.

Between the one arm of the beam and the second (floating) piston a further toggle extends and is also journaled in part-spherical (dimpled) means on the other side of said fulcrum.

In that configuration, the rocker arm is preferably journaled at its center (fulcrum) on an axially adjustable screw. In this manner, the ratio of the idle of the two braking circuits can be adjusted simply by setting the screw. This ratio, termed "stroke distribution" can also be adjusted by altering the length of the abutment projecttions of the two pistons. In accordance with the present invention, this may be achieved in the simplest possible manner by turning the screw.

Since, in the event of failure of the primary braking circuit, substantial forces must be transmitted via the rocker arm, the latter preferably has the shape of a dish with a pressed-in bottom. This structure is extremely strong and is protected against deformations.

In order that the hydraulic fluid can flow without obstruction through the said support member, the latter is provided with holes.

Preferably each of the two pistons is provided with a projection which, on one brake circuit failing, come to abut either on the end of the secondary cylinder or on the metal support member, depending upon which circuit fails. In this manner, even if one braking circuit fails, reliable operation of the other braking circuit continues.

BRIEF DESCRIPTION OF THE DRAWING

The figure is an axial section view of a device according to the present invention, the sectioning plane having been passed through the longitudinal centerlines of both of the first and second cylinders.

DESCRIPTION OF THE PREFERRED EMBODIMENT

The invention will now be described by way of example, with reference to the figure, which is a longitudinal section of a twin main cylinder according to the invention.

It will be noted that the twin master cylinders of the invention comprise a primary cylinder 1 and a physically parallel secondary cylinder 2. The primary cylinder 1 contains a suitable obturated pressure piston 3, which is operated from the left, in terms of FIG. 1, by means of an actuating rod 4, while the secondary cylinder 2 contains a floating piston 6. The actuating rod 6, would normally be connected to a foot pedal linkage in an automative system, and is dust covered by a resilient boot 5.

At the right-hand end of the figure, the two cylinder spaces are hydraulically interconnected, so that hydraulically produced pressure is transmitted by displacement of the pressure piston 3 to the right to the floating piston 6. The force is thus not halved as is the case in prior art twin master cylinders.

Between the pressure piston 3 and the floating piston 6, there exists the following series of parts: A compression spring 7, a piston-shaped metal support member, a toggle 9, a rocker arm or tilting beam 10 supported on the conical end 11 of a screw 13, and another togggle 12.

The toggles 9 and 12 are journaled in rounded conical cavities in the piston body 6 and in the dimple of 8. In the member 8, it is to be understood that there are fluid passage holes opening the cavity around spring 8 to fluid flow toward or from the cavity around toggle 9.

In the walls of the two cylinders 1 and 2, draining holes 14 and 15 are represented as they would be seen if the figure were an assembly view without sectioning.

At the ends of the pistons there are projections 17 and 16 which come into contact with the end wall of the secondary cylinder 2 or with the metal support member 8, respectively, when the corresponding braking circuit fails and a braking action is undertaken. Between the floating piston 6 and the end wall of secondary cylinder 2 there extends a second helical spring 18 which is stiffer than the helical spring 7. In the case of spring 7, the restoration (after braking) of the rod 4 to its initial position is all that is required, however spring 18 must restore 6 against residual hydraulic pressure and indirectly and momentarily helps to restore 3. Moreover, spring 18 being the stronger one, the rocker arm 10 does not move in normal compression of 7.

However, if the first braking circuit fails, the helical spring 7 is compressed until the projection 16 comes to rest on the member 8. The braking force is now transmitted mechanically via the toggle 9, the rocker arm 10 and the toggle 12 directly to the floating piston 6 and the second braking circuit is put into operation.

The hydraulic line connections to first and second cylinders are shown at 19 and 20 respectively. Seals and obturation devices included in the drawing are similar to those known in prior art structures and do not of themselves form a part of the present invention.

In a preferred embodiment of the invention the rocker arm 10 is in the form of a double dish-like structure with a dimpled bottom. This structure achieves a high degree of strength and stability as it is required in order to transmit the necessary braking force if the primary braking circuit should fail, and is easily and economically fabricated.

What is claimed is:

1. A twin master cylinder device contained within a housing and being adapted to dual circuit vehicular hydraulic braking systems comprising:
   first and second hydraulic cylinders arranged in juxtaposition;
   first and second axially slidable pistons in said first and second cylinder respectively;
   mechanical input means attached to a first end of said first piston to cause axial movement thereof in response to a braking action;
   a spring retaining piston slidably emplaced in said first cylinder at a predetermined location from the second end of said first piston;
   first spring means for exerting a force tending to separate said first piston and said spring retaining piston;
   means comprising first and second hydraulic fluid chambers at the outputs of said first and second cylinders respectively;
   first and second output pressure connections connected to said first and second fluid chambers respectively;
   means providing hydraulic communication between said first fluid chamber and the driven end of said second piston, whereby hydraulic pressure resulting from actuation of said first piston actuates said second piston; and
   means including a mechanical linkage responsive to movement of said spring retaining piston for actuating said second piston in response to an actuation of said first piston beyond a predetermined amount whereby a portion of said first piston engages said spring retaining piston and causes movement thereof.

2. The invention set forth in claim 1 further defined in that said means providing hydraulic communication includes at least one hole permitting fluid flow through said spring retaining piston.

3. The invention set forth in claim 2 further defined in that said cylinders in juxtaposition are arranged with their axial centerlines substantially parallel.

4. The invention set forth in claim 2 in which said mechanical linkage comprises a rocker arm bearing against a fulcrum support anchored in said housing of said cylinders, and flexibly connected at one side of said fulcrum to said spring retaining piston and to said driven end of said second piston on the other side of said fulcrum.

5. The invention set forth in claim 2 in which said driven end of said second piston and the face of said spring retaining piston toward said mechanical linkage are concave, said rocker arm is concave dimpled on each side of said fulcrum in the opposite direction, and a pair of toggles are included, one retained between said consave portion of said second piston and one concave portion of said rocker arm and the other retained between said concave face of said spring retaining piston and the other concave portion of said rocker arm, thereby supplying said mechanical linkage.

6. The invention set forth in claim 2 in which is included a second spring means acting to exert separation pressure between said second piston and the closed end of said second cylinder.

7. The invention set forth in claim 6 further defined in that said second spring means has a larger force versus deflection constant than said first spring means, whereby, said second piston is not appreciably moved by movement of said first piston short of engagement of said portion of said first piston and said spring retaining piston, solely as a result of forces transmitted mechanically.

8. The invention set forth in claim 7 further defined in that said first and second spring means comprises helical springs of outside diameter fitting within the inside diameters of said first and second cylinders respectively.

9. The invention set forth in claim 4 further defined in that said fulcrum of said rocker arm bears on the rounded conical end of a screw arranged for axial adjustment within the end of the said housing opposite said mechanical input means.

References Cited

UNITED STATES PATENTS 2,162,114  6/1939  Oliver.

MARTIN P. SCHWADRON, Primary Examiner

R. BUNEVICH, Assistant Examiner

U.S. Cl. X.R.

188—152